United States Patent [19]

Lynn et al.

[11] Patent Number: 4,911,757
[45] Date of Patent: Mar. 27, 1990

[54] PROCESS FOR CHEMICAL STABILIZATION OF HEAVY METAL BEARING DUSTS AND SLUDGES

[75] Inventors: John D. Lynn, Center Valley; Charles E. Jablonski; Walter D. Egan, both of Bethlehem, all of Pa.

[73] Assignee: Bethlehem Steel Corporation, Bethlehem, Pa.

[21] Appl. No.: 349,006

[22] Filed: May 9, 1989

Related U.S. Application Data

[63] Continuation-in-part of Ser. No. 227,438, Jul. 29, 1988, Pat. No. 4,840,671, which is a continuation of Ser. No. 63,605, Jun. 18, 1988, abandoned.

[51] Int. Cl.⁴ .......................... C04B 7/24; C04B 7/26; C04B 11/26
[52] U.S. Cl. ..................................... 106/85; 106/120; 106/DIG. 1; 501/155
[58] Field of Search ................... 106/85, 120, DIG. 1; 501/155

[56] References Cited

U.S. PATENT DOCUMENTS

| | | | |
|---|---|---|---|
| Re. 29,783 | 9/1978 | Smith et al. | 210/59 |
| 3,341,341 | 9/1967 | Corson et al. | 106/98 |
| 3,634,115 | 1/1972 | Minnick | 106/85 |
| 3,720,609 | 3/1973 | Smith et al. | 210/59 |
| 3,852,084 | 12/1974 | Webster et al. | 106/118 |
| 4,116,705 | 9/1978 | Chappell | 106/90 |
| 4,668,124 | 5/1987 | Pitts et al. | 501/129 |
| 4,741,776 | 5/1988 | Bye et al. | 106/89 |

*Primary Examiner*—Mark L. Bell
*Assistant Examiner*—David M. Brunsman
*Attorney, Agent, or Firm*—Steele, Gould & Fried

[57] ABSTRACT

A calcium-alumino-silicate composition comprising the reaction product of electric arc furnace dust and/or an aqueous chemical waste sludge including a source of ferrous ions and selective additive materials, the additive materials are selected so that the total composition of the additive ingredients and said sludge includes fly ash, electric arc furnace dust, lime kiln dust, ferrous sulfate, hydrated lime to provide an alkalinity of about 9 to 9.5% and water, the composition contains at least 0.2% by weight of ferrous ions and is hardenable through chemical reactions, the product of which includes calcium-alumino-silicates.

11 Claims, No Drawings

PROCESS FOR CHEMICAL STABILIZATION OF HEAVY METAL BEARING DUSTS AND SLUDGES

RELATED APPLICATIONS

This application is a continuation-in-part of application Ser. No. 227,438 filed July 29, 1988, now U.S. Pat. No. 4,840,671 which was a file wrapper continuation of Ser. No. 063,605 abandoned, filed June 18, 1988.

BACKGROUND OF THE INVENTION

The present invention, pozzolanic compositions obtained from a process for the chemical stabilization of heavy metal dusts and sludges, has particular utility for the steel industry where control of furnace emissions are necessary. More particularly, the compositions of the invention comprise heavy metals entrapped in a calcium-alumino-silicate matrix.

The basic or dominant steelmaking practice followed today in the domestic and foreign steel industry is the basic oxygen process. Such process utilizes molten pig iron as the basic charge to the furnace, which thereafter is refined and alloyed as required. This process requires the ready availability of molten pig iron produced by blast furnaces.

Where molten pig iron is not available, and/or for the production of certain specialty grades of steel, an electric arc furnace (EAF) process is followed. In a typical EAF process, solid charge ingredients including raw scrap, limestone, burnt lime, iron ore and ferro alloy additives, are placed in the top-charge furnace unit. A conventional furnace unit is equipped with (1) a roof lift and swing arrangement which permits the roof to swing aside when cold scrap is charged into the furnace; (2) a rocker and rail tilting type arrangement which permits the furnace to tilt forward for tapping and backward for slagging; (3) a system for additions through the furnace roof; and (4) evacuation systems for the removal of dust generated during the steelmaking cycle.

The electrodes are supported by electrode arms and clamps and project from overhead, down through the furnace roof. The electrodes are automatically controlled by an electro-mechanical positioning mechanism. An electric arc surging between the electrodes and scrap produces heat which melts the charge and refines the steel. The molten steel is tapped, typically at about 3000° F., into a ladle and cast into blooms or poured into ingot molds.

In such a process, particulate emissions are generated during (1) charging of scrap, (2) tapping of furnaces, (3) pneumatic injection of additives, (4) oxygen blowing and (5) meltdown/refining periods. This particulate, EAF dust, is collected in baghouses. Even though carefully monitored landfills have been used to minimize the problems associated with EAF dust, the EPA has determined that such inorganic dust constitutes a hazardous waste. More specifically, EAF dust is currently classified as EPA Hazardous Waste No. K061 (emission control dust/sludge from the primary production of steel in electric furnaces) and, accordingly, must be managed as a hazardous waste.

As a result of this determination, there has actively been pursued various methods for managing EAF dust. The present invention is the result of this pursuit and comprises a chemical stabilization process which renders the hazardous constituents in the dust virtually immobile. Such process is based on the pozzolanic reaction of materials containing anhydrous alumino-silicates which, in the presence of lime, water and chemicals, adsorb and/or physically entrap the heavy metals present in EAF dust into a calcium-alumino-silicate matrix, thereby rendering them essentially immobile. The composition process and the results achieved thereby will be described in greater detail in the specifications which follow.

The process and compositions of the present invention can be utilized in the stabilization of hazardous and non-hazardous heavy metal-bearing wastes including wastewater treatment sludges from electroplating operations, steel forming and steel finishing operations, metal recovery wastes, municipal fly ash, and the like. These stabilized compositions can be used to provide a final cover for a landfill.

U.S. Pat. No. 4,465,597, of the present assignee, which is herewith incorporated by reference, discloses typical sludges which are utilized in the present invention.

SUMMARY OF THE INVENTION

The present invention is directed to a chemical stabilization process whereby the hazardous constituents in the EAF dust and/or sludge are rendered virtually immobile and the stabilized composition can be used for landfills. The process is based on the pozzolanic reaction of materials containing anhydrous alumino-silicates which, in the presence of lime, water and chemicals, adsorb and/or physically entrap the heavy metals present in EAF dust and/or sludge into a calcium-alumino-silicate matrix.

In one of the several methods for chemical stabilization, the process includes mixing of the sludge and/or EAF dust with lime kiln dust, fly ash and hydrated lime to produce a blend having an available alkalinity of 9-9.5%. After dry mixing, an aqueous solution containing ferrous hydroxide and calcium sulfate, produced by mixing ferrous sulfate hepta-hydrate, calcium hydroxide and water and adjusted to a pH of about 7, is added to the dry mix. Such mixture is then added to the mixing vessel and thoroughly mixed. The resulting blend, containing about one-third by weight of EAF dust and/or sludge, having been rendered non-hazardous, may be suitably utilized as landfill material as either a cap or liner.

The general requirements for landfill final cover design can be summarized as: a cap or the final cover must be engineered to minimize infiltration of precipitation into the landfill, therefore it must be no more permeable than a liner system; conditions for operation with minimum maintenance and good drainage with minimum erosion must be met; any potential distruption of continuity and functionality of the cover must be minimized. A final cover is required to have three layers: a vegetated top cover, a middle drainage layer and a low permeability bottom layer. It has been found that the pozzolanic compositions of the invention may be utilized to provide the low permeable bottom layer or liner.

The function of the present compositions of the invention as low permeability layer is to reject transmission of fluid into the landfill. By minimizing infiltration, the generation of leachate will be minimized and also filling of the landfill with leachate (the "bathtub" effect) will be prevented. It is expected that the upper component or the geomembrane will deteriorate in time. Then the compacted layer will be expected to fulfill prevention of infiltration. Settlement and frost heaving are the two occurrences that can disrupt the functionality of this layer. Therefore, design of such systems should take into consideration the long-term settlement and differential settlement of the material underneath the cap. To prevent frost heaving, the entire layer should be placed below the average depth of frost penetration in the area. Also, since the sludge contains organic materials, it is well suited for use in the land environment.

If the low permeable layer is to be used as an interim cap without the benefit of the protection of vegetative layer and the drainage layer, other concerns arise. If the layer is exposed, erosion and crack development due to dessication can be added to the above referred causes of disruption. A solidified material with low permeability and relatively high strength can be a candidate for such an application, provided that the following factors are taken into consideration. Such a cap needs to be designed to provide allowances for or prevent (1) settlement, (2) frost heaving, (3) crack development and (4) erosion.

BRIEF DESCRIPTION OF THE DRAWING

The FIGURE is a graphic representation of data demonstrating the advantages achieved by this invention to significantly reduce the EPIT leachable lead concentration of an EAF dust chemically stabilized by the practice of this invention.

DETAILED DESCRIPTION OF THE PREFERRED EMBODIMENT(S)

The present invention is directed primarily to pozzolanic compositions obtained from a chemical stabilization process for the treatment of hazardous waste, such as the dust generated by an electric arc furnace (EAF) process and/or waste water treatment sludge and the like. This process is based on the pozzolanic reaction of materials containing anhydrous alumino-silicates which, in the presence of lime, water and chemicals, adsorb and/or physically entrap the heavy metals present in EAF dust and/or sludge into a calcium-alumino-silicate matrix, thereby rendering them essentially immobile. The reaction ultimately produces a relatively impermeable concrete-like solid composition which can be utilized.

To appreciate the contributions of this invention, it may be helpful to review the standards which have been developed under the direction of the U.S. Environmental Protection Agency (EPA). The EPA has determined that lead, cadmium and chromium are the constituents of concern for EAF dust, and has set the following maximum Extractive Procedure Toxicity Test (EPIT) leachate concentration limits for delisting a hazardous material, i.e. less than six times drinking water standard (6XDWS):

| Lead | 0.30 mg/l |
|---|---|
| Cadmium | 0.06 mg/l |
| Chromium | 0.30 mg/l |

Based on years of experience with the operation of an electric furnace shop, EPIT results for EAF dust, when untreated, are typically:

| Lead | 139 mg/l |
|---|---|
| Cadmium | 1.7 mg/l |
| Chromium | 0.9 mg/l |

Based on the EPA mandate to effectively manage the hazardous EAF dust, an extensive investigation was undertaken to develop a system to stabilize the hazardous waste and render it virtually immobile. The present invention is the result of such investigation. EPIT of EAF dust, when subjected to the chemical stabilization process of this invention, will exhibit a significantly reduced hazardous constituent level, before and after an extended cure time, on the order of:

| Lead | 0.02 mg/l |
|---|---|
| Cadmium | 0.02 mg/l |
| Chromium | 0.07 mg/l |

In the practice of this invention, the chemicals utilized herein include:
Fly ash and/or sludge, the major constituents being $SiO_2$ and $Al_2O_3$
Lime dust, the major constituent being CaO
Hydrated lime, the major constituent being $Ca(OH)_2$
Ferrous sulfate hepta-hydrate While the proportions of such chemicals may vary over a limited range as set forth hereinafter, a relationship for practicing this process is one where, by approximate weight %, the ingredients include EAF dust (35), fly ash (6), lime kiln dust (15), ferrous sulfate heptahydrate (10), hydrated lime (6) and water (28).

Using such proportions, the process involves the following steps:

1. Mixing of EAF dust and/or sludge, lime kiln dust, fly ash and hydrated lime for approximately 1 to 2 minutes. If necessary, the hydrated lime may be varied to insure a blend having an available alkalinity of between 9 and 9.5%.

2. Adding to said mixture an aqueous solution having a pH of about 7 and made from water, ferrous sulfate hepta-hydrate and calcium hydroxide.

3. Blending for approximately 10 minutes to yield a viscous paste-like material which, when cured with time, i.e., hours, produces an impermeable concrete-like solid waste. The hardening process may continue for a period of several weeks, or longer.

In accordance with an embodiment of the invention, there is provided a calcium-alumino-silicate composition comprising the reaction product of an aqueous chemical waste sludge or EAF dust including a source of ferrous ions and selective additive materials. The additive materials are selected so that the total composition of the additive ingredients and the sludge includes fly ash, electric arc furnace dust, lime kiln dust, ferrous sulfate, hydrated lime to provide an alkalinity of about 9 to 9.5%, and water. The resulting composition contains at least 0.2% by weight of ferrous ions and is hardenable through chemical reactions so that the product includes calcium-alumino-silicates.

Preferably, the composition is the reaction product of about 25 to 70% by weight of sludge or electric arc furnace dust, about 30 to 10% by weight fly ash, about 10 to 20% by weight of lime kiln dust, about 5 to 15% by weight of a ferrous compound, about 5 to 15% by weight of lime, and the remainder being water.

Advantageously, the ferrous compound is obtained from waste pickle liquor.

The weight percent of ferrous ion in the composition is usually about 0.2 to 10% by weight. However, the amount may be higher without suffering any adverse effects.

The calcium content of the composition is generally about 5 to 10% by weight. The composition also has a content of silicon oxide of about 2 to 10% by weight and a content of aluminum oxide of about 1 to 5% by weight.

In the development of this invention, it was discovered that a key feature thereof was the presence of ferrous ions. Much of the earlier work was conducted using laboratory or pilot trials of ferrous sulfate heptahydrate, the preferred practice outlined above. However, the source of such ferrous ions need not be so clinically clean but may, for example, be derived from such industrial sources as waste pickle liquor, a waste by-product in the steelmaking process. The suitability of such a source for the ferrous ions renders this invention particularly noteworthy. That is, this invention can make productive use of a waste by-product to render the constituents of a hazardous waste virtually immobile.

The FIGURE is a graphic illustration showing the unexpected advantages gained through the inclusion of ferrous ions in the practice of this invention. The FIGURE shows the effect of EP Toxicity leachate pH on Pb concentration of chemically stabilized EAF dust, both with and without ferrous ions. The upper curve represents data in which the ferrous ions were omitted from the aqueous solution. While a distinct advantage was achieved by controlling the pH thereof to a range of about 9 to 10, the concentration of Pb was significantly above that of material made with aqueous solution containing ferrous ions, as represented in the data of the lower curve.

Data to be presented hereafter indicates that as little as 0.2% by weight of ferrous ions can effectively reduce the lead concentration as well as cadmium and chromium levels, to acceptable EPA standards.

To demonstrate the effectiveness of this process to detoxify EAF dust, twenty-one (21) randomly selected samples were tested. The results thereof, insofar as the hazardous elements cadmium, chromium and lead are concerned, are listed in TABLES I and II (before and after curing).

TABLE I

EP TOXICITY TESTS[1] for Cd, Cr, Pb (before curing)

| Sample Identification | Constituent (mg/l) | | |
|---|---|---|---|
| | Cadmium | Chromium (Total) | Lead |
| A | <0.02 | <0.05 | <0.01 |
| B | <0.02 | <0.05 | 0.02 |
| C | <0.02 | <0.05 | 0.02 |
| D | <0.02 | <0.05 | 0.03 |
| E | <0.02 | <0.05 | 0.02 |
| F | <0.02 | <0.05 | <0.01 |
| G | <0.02 | <0.05 | 0.01 |
| H | <0.02 | <0.05 | <0.01 |
| I | <0.02 | <0.05 | 0.01 |
| J | <0.02 | <0.05 | 0.03 |
| K | <0.02 | <0.05 | 0.02 |
| L | <0.02 | <0.05 | 0.01 |
| M | <0.02 | <0.05 | 0.02 |
| N | 0.02 | <0.05 | 0.03 |
| O | <0.02 | 0.05 | 0.02 |
| P | <0.02 | <0.05 | <0.01 |
| Q | <0.02 | 0.12 | <0.01 |
| R | <0.02 | 0.16 | <0.01 |
| S | <0.02 | 0.13 | <0.01 |
| T | <0.02 | 0.13 | <0.01 |
| U | <0.02 | <0.05 | <0.01 |
| Average[2] | 0.02 | 0.07 | 0.02 |

[1]All EP Toxicity tests and resultant extract analyses were performed in accordance with procedures outlined under 40 CFR 261, Appendices II and III.
[2]Less than signs were omitted in computation of averages.

TABLE II

EP TOXICITY TESTS[1] for Cd, Cr, Pb (after curing)

| Sample Identification | Constituent (mg/l) | | |
|---|---|---|---|
| | Cadmium | Chromium (Total) | Lead |
| A | <0.02 | <0.08 | 0.03 |
| B | 0.03 | <0.05 | 0.03 |
| C | <0.02 | <0.05 | 0.02 |
| D | <0.02 | <0.05 | 0.02 |
| E | 0.02 | <0.05 | 0.02 |
| F | <0.02 | <0.05 | <0.01 |
| G | <0.02 | 0.07 | 0.02 |
| H | 0.02 | <0.05 | 0.02 |
| I | 0.03 | <0.05 | <0.01 |
| J | <0.02 | 0.14 | <0.01 |
| | (0.03) | (0.07) | (0.03) |
| K | <0.02 | 0.17 | <0.01 |
| | (<0.02) | (0.05) | (0.02) |
| L | <0.02 | 0.07 | <0.01 |
| M | <0.02 | <0.16 | <0.01 |
| | (0.03) | (0.07) | (0.01) |
| N | 0.02 | 0.05 | <0.01 |
| | (<0.02) | (0.06) | (0.01) |
| O | <0.02 | 0.09 | 0.01 |
| P | <0.02 | 0.06 | 0.03 |
| | (0.02) | (0.05) | (0.01) |
| Q | <0.02 | 0.06 | 0.04 |
| | (0.02) | (0.05) | (0.02) |
| R | <0.02 | 0.05 | 0.03 |
| S | <0.02 | 0.06 | 0.02 |
| T | <0.02 | 0.06 | 0.03 |
| U | <0.02 | 0.09 | 0.03 |
| Average[2] | 0.02 | 0.07 | 0.02 |

[1]All EP Toxicity tests and resultant extract analyses were performed in accordance with procedures outlined under 40 CFR 261, Appendices II and III. EP Toxicity tests for samples J, K, M, N, P and Q were done on separate portions of cured material ground to pass through 9.5 mm and 0.149 mm sieves. Results for portions passed through a 0.149 mm sieve are shown in parenthesis. All other results are for samples ground to pass through a 9.5 mm sieve.
[2]Less than signs were omitted in computation of averages.

In addition to, and in support of, the toxicity tests reported in TABLES I and II, a multiple extraction procedure was performed on six (6) samples to quantify the long term leaching characteristic of EAF dust chemically stabilized by the process of this invention. The multiple extraction procedure used was based on a procedure submitted to the U.S. EPA by Stablex Corporation and cited in the Federal Register Notice of Nov. 22, 1982, page 52687. The results are reported in TABLE III.

TABLE III

MULTIPLE EXTRACTION PROCEDURE FOR Cd, Cr, Pb
(after curing, day 1 and day 9)

| Constituent | Sample | | | | | | | |
|---|---|---|---|---|---|---|---|---|
| | A | | B | | D | | E | |
| (mg/l) | Day 1 | Day 9 | Day 1 | Day 9 | Day 1 | Day 9 | Day 1 | Day 9 |
| Cadmium | <0.02 | <0.02 | <0.02 | <0.02 | <0.02 | <0.02 | <0.02 | <0.02 |
| Chromium | 0.08 | <0.05 | <0.05 | <0.05 | <0.05 | <0.05 | <0.05 | <0.05 |
| Lead | 0.01 | 0.02 | 0.01 | 0.01 | 0.01 | 0.01 | 0.01 | 0.02 |

| Constituent | G | | H | |
|---|---|---|---|---|
| (mg/) | Day 1 | Day 9 | Day 1 | Day 9 |
| Cadmium | <0.02 | <0.02 | <0.02 | <0.02 |
| Chromium | <0.05 | <0.05 | <0.05 | <0.05 |
| Lead | 0.01 | 0.01 | 0.01 | 0.01 |

The results show no significant increase in the hazardous constituents concentration at the conclusion of the nine day test period.

While the foregoing represents a preferred embodiment and the results to be achieved by this invention, variations in the proportions of the chemicals have been used to achieve comparable results. For example, in blending the EAF dust, lime kiln dust, fly ash and hydrated lime, it is desirable to have an available alkalinity of between 9 and 9.5% CaO. However, tests have shown that effective results can be achieved with an available alkalinity of between 6.9 and 11.5% CaO. A series of tests were conducted varying either the % CaO of the dry blend or the pH of the ferrous ion solution. The results of such tests are reported in TABLE IV.

practice of this invention. However, a preferred aim is a pH of 7. As a consequence, the pH of the EP toxicity test leachate can vary between about 7.8 to 10.9 to achieve constituent levels which are still less than 6XDWS.

The variations in the respective pH levels is clearly dependent upon the respective quantities and sources of ingredients which comprise the additives for practicing the process of this invention. A further series of tests were conducted to vary such additives. The results thereof are reported in TABLE V.

TABLE V

VARIATION IN ADDITIVE QUANTITY

| Additive (gm) | Sample | | | | | | | | |
|---|---|---|---|---|---|---|---|---|---|
| | P' | Q' | R' | S' | T' | U' | V' | W' | X' |
| EAF dust | 550 | 550 | 550 | 550 | 550 | 550 | 550 | 550 | 550 |
| Lime kiln dust | 350 | 350 | 400 | 350 | 200 | 250 | 300 | 300 | 250 |
| Fly ash | 210 | 210 | 150 | 165 | 175 | 165 | 175 | 175 | 175 |
| Hydrated lime | 25 | 25 | 100 | 65 | 140 | 55 | 35 | 40 | 200 |
| $Fe_2SO_4 \cdot 7H_2O$ | — | 50 | 180 | — | 165 | — | 12 | 25 | 300 |
| $H_2O$ | 240 | 300 | 450 | 350 | 500 | 300 | 285 | 300 | 550 |
| EPTT Constituent (mg/l) | | | | | | | | | |
| Pb | 1.2 | 0.3 | <.01 | .40 | .01 | .19 | .03 | <.01 | <.01 |
| Cd | <.02 | <.02 | <.02 | .08 | <.02 | <.02 | <.02 | <.02 | <.02 |
| Cr | 1.4 | <.05 | <.05 | .11 | <.05 | .23 | .08 | .05 | <.05 |
| EPTT pH | 11.0 | 9.5 | 10.0 | 8.0 | 7.8 | 10.7 | 8.8 | 9.3 | 8.9 |

Water was added for consistency to insure flowability of the mixture. One skilled in the art could readily determine that quantity of water to be added to the mixture. Since mixing may be automatic or even manual, one can easily determine the amount of water

TABLE IV

VARIATION IN METHOD PARAMETERS

| Parameter | Sample | | | | | | | | | | | | | |
|---|---|---|---|---|---|---|---|---|---|---|---|---|---|---|
| | A' | B' | C' | D' | E' | F' | G' | H' | I' | J' | K' | L' | M' | N' |
| Dry Mix, % CaO | 7.9 | 9.0 | 10.0 | 6.9 | 7.9 | 9.0 | 6.6 | 10.8 | 7.0 | 11.5 | 7.0 | 7.0 | 10.9 | 9 |
| ++ Soln. pH | 6.6 | 6.6 | 6.6 | 6.8 | 6.8 | 6.8 | 7.0 | 7.0 | 7.0 | 7.0 | 11.4 | 7.0 | 7.0 | 6.2 |
| EPTT Constituent (mg/l) | | | | | | | | | | | | | | |
| Pb | <.01 | <.01 | <.01 | .02 | <.01 | <.01 | .02 | <.01 | .04 | .02 | .03 | .05 | <.01 | <.01 |
| Cd | <.02 | <.02 | <.02 | .03 | <.02 | <.02 | .11 | <.02 | .20 | <.02 | .02 | .22 | <.02 | <.02 |
| Cr | <.05 | <.05 | <.05 | <.05 | <.05 | <.05 | <.05 | <.05 | <.05 | <.05 | <.05 | <.05 | <.05 | <.05 |
| EPTT pH | 8.3 | 8.8 | 9.6 | 7.9 | 8.2 | 8.4 | 7.6 | 10.5 | 7.7 | 10.9 | 7.8 | 7.5 | 10.3 | 9.7 |

Samples A' thru F' prepared using ferrous sulfate hepta-hydrate.
Samples G' thru N' prepared using waste pickle liquor for $Fe^{++}$ soln.

Thus, in addition to the latitude in selecting the % of CaO of the dry mix, the process offers some flexibility in the range of pH for the ferrous ion solution. Specifically, a pH between about 6.2 to 11.4 is suitable in the needed to achieve a thorough but flowable mixture for the manner and total quantity to be mixed. From TABLE V, the percentage of water varied between about 17.5% (Sample P') to about 28.9% (Sample T').

While samples Q', R', T', V', W' and X' represent samples from practices within the scope of this invention, particular attention is drawn to the comparison of Samples U', V' and W'. In U', without the addition of ferrous ions, the constituent levels for Pb and Cr were well above the levels to be achieved by the chemical stabilization process of this invention, even though these levels may be less than the required 6XDWS for delisting. In V', with the addition of less than 1% by weight ferrous ions, the levels of Pb and Cr were significantly reduced. In W', by doubling the amount of ferrous ions, Pb and Cr levels were further reduced.

While the presence of ferrous ions has a clear demonstrated impact on the successful practice of this invention, there is an obvious leveling off as the quantity increases. For example, in X', the weight % of ferrous ions was about 3.0. However, the constituent levels for Pb, Cd and Cr varied very little from W'. Accordingly, the upper limit for the ferrous ions is dictated more by economics and effects on pH rather than results.

All of the above test samples listed in TABLE V were prepared on the basis of first combining the dry materials, i.e. EAF dust, lime kiln dust, fly ash, hydrated lime and ferrous sulfate hepta hydrate, followed by mixing with water for consistency. However, based on experience and knowledge in selecting the various constituents, it is possible to mix all desired constituents in a single batch mixing operation.

Finally, the efficiency of the process from the dual standpoint of controlling toxicity and cost of operations dictates that as much EAF dust or sludge be treated as practical. It has been shown that the EAF dust or sludge may advantageously comprise approximately 65% by weight of the mixture.

EXAMPLE 1

Table VI presents the various components of the solidified specimens obtained by the present invention.

TABLE VI

| Sample | Components of Four Samples by Weight | | | |
|---|---|---|---|---|
| | A | B | C | D |
| Sludge* | 52.5 | 51.2 | 24.3 | 50.0 |
| Proprietary Ingredient | 10.5 | 28.4 | 15.9 | 29.0 |
| Fine Slag | — | — | 50.0 | — |
| Fly Ash | 10.5 | 10.2 | 4.9 | 10.0 |
| Hydrated Lime | 10.5 | 10.2 | 4.9 | 10.0 |
| Water | 16.0 | — | — | — |
| Bentonite | — | — | — | 1.0 |

*Steel plant waste containing various iron compounds, oils, greases, etc.

The above-identified samples were prepared in 3" diameter and 6" length molds and allowed to cure in a humidity controlled chamber (95%) at about room temperature. Curing time was varied at 1, 7, 28 and 90 days for most samples. At the completion of each curing period, samples were tested for permeability, unconfined compressive strength and triaxial compressive strength. Each test was repeated on at least 3 samples and the results were averaged. The triaxial compression tests were conducted to assess the variation in cohesion and friction angle of the material as the curing progressed. The permeability tests were conducted in Lehigh triaxial permeability cells manufactured to carry long-term hazardous waste research. The results of these tests are tabulated in Table VII.

TABLE VII

Results of Strength and Permeability Tests on the Four Samples of Table VI

| Detox Sample | Curing Period (days) | $q_u$* (psi) | $k$* (cm/s) | $c$* (psi) | $\sigma$* (deg.) |
|---|---|---|---|---|---|
| A | 1 | 80.8 | $2.7 \times 10^{-7}$ | 34.5 | 9.5 |
| | 7 | 97.6 | $2.9 \times 10^{-7}$ | 19.2 | 30.8 |
| | 28 | 131.8 | $2.6 \times 10^{-7}$ | 30.1 | 30.0 |
| | 90 | 110.1 | $1.3 \times 10^{-6}$ | 23.1 | 30.0 |
| B | 1 | 81.1 | $7.5 \times 10^{-7}$ | — | — |
| | 28 | 95.3 | $1.3 \times 10^{-5}$ | 28.3 | 23.2 |
| C | 1 | 147.1 | $7.8 \times 10^{-7}$ | 6.7 | 41.8 |
| | 7 | 204.3 | $4.2 \times 10^{-7}$ | 18.5 | 30.0 |
| | 28 | 207.8 | $1.2 \times 10^{-6}$ | 35.6 | 34.5 |
| D | 1 | 59.7 | $8.0 \times 10^{-7}$ | 11.6 | 18.9 |
| | 7 | 131.3 | $9.9 \times 10^{-7}$ | 19.5 | 34.7 |
| | 28 | 131.8 | $1.8 \times 10^{-6}$ | — | — |

*$q_u$ Unconfined compressive strength
$k$ Coefficient of permeability
$c$ Cohesion
$\sigma$ Internal friction angle

EXAMPLE

A low permeability cover to promote surface water runoff on a four acre site was prepared with the composition of the invention. Drill hole samples from a landfill containing basic oxygen furnace thickener sludge were obtained and tested. The results are shown in Table VIII.

TABLE VIII

TOTAL CONSTITUENT ANALYSES OF DISPOSAL CELL DRILL CORE SAMPLES
CONSTITUTENT % (Water & Oil Free)

| Sample | H$_2$O | O & G** | Fe | C*** | C | Zn | Pb | Ca | SiO$_2$ | Al$_2$O$_3$ | Ni | Cr | Cu | Na$_2$O | K$_2$O | MgO |
|---|---|---|---|---|---|---|---|---|---|---|---|---|---|---|---|---|
| S-7 1A | 26.3 | NA | 50.6 | 2.3 | 3.7 | 1.0 | 0.13 | 7.1 | NA | NA | NA | NA | NA | NA | NA | NA |
| S-7 1B | 26.1 | NA | 57.8 | 1.2 | 2.5 | 0.45 | 0.09 | 7.0 | NA | NA | NA | NA | NA | NA | NA | NA |
| S-7 2A | 27.4 | 1.40 | 47.7 | 1.9 | 3.4 | 1.3 | 0.14 | 7.2 | 4.0 | 1.9 | <.05 | <.05 | <.05 | 0.08 | 0.08 | 3.3 |
| S-7 2B | 32.8 | 0.43 | 49.1 | 1.6 | 3.1 | 0.79 | 0.13 | 7.4 | 4.1 | 0.85 | <.05 | <0.5 | <0.5 | 0.13 | 0.14 | 3.3 |
| S-7 2C | 29.7 | 0.68 | 46.8 | 2.9 | 4.4 | 0.76 | 0.18 | 7.1 | 5.0 | 1.2 | <.05 | <.05 | <.05 | 0.14 | 0.15 | 3.3 |
| S-7 3A | 29.7 | 1.00 | 50.1 | 1.2 | 2.7 | 1.2 | 0.15 | 6.9 | 3.3 | 1.3 | <.05 | <.05 | <.05 | 0.08 | 0.07 | 1.7 |
| S-7 3B | 35.3 | 0.51 | 50.1 | 1.1 | 2.6 | 0.78 | 0.09 | 7.3 | 4.0 | 0.70 | <.05 | <.05 | <.05 | 0.09 | 0.10 | 3.3 |
| S-7 3C | 33.5 | 0.17 | 48.4 | 2.2 | 3.7 | 0.83 | 0.13 | 7.2 | 4.7 | 1.2 | <.05 | <.05 | <.05 | 0.12 | 0.15 | 3.3 |
| S-7 4A | 30.4 | NA | 47.9 | 2.7 | 4.3 | 1.3 | 0.10 | 7.3 | NA | NA | NA | NA | NA | NA | NA | NA |
| S-7 4B | 32.1 | NA | 48.5 | 2.1 | 3.7 | 0.57 | 0.12 | 7.6 | NA | NA | NA | NA | NA | NA | NA | NA |
| Avg $\overline{X}$ | 30.0 | 0.7 | 49.2 | 1.9 | 3.1 | 0.9 | 0.13 | 7.2 | 4.2 | 1.2 | <.05 | <.05 | <.05 | 0.11 | 0.12 | 2.5 |
| $\sigma$ | 3.1 | 0.4 | 1.7 | 0.6 | 1.1 | 0.3 | 0.03 | 0.2 | 0.6 | 0.4 | — | — | — | 0.03 | 0.04 | 1.3 |

**O & G = oil and grease concentration on a dry basis
***elemental carbon
NA = not analyzed

What is claimed is:
1. A calcium-alumina-silicate composition comprising:
the reaction product of 25–70% by weight of a waste material selected from the group consisting of aqueous chemical waste sludge and electric arc furnace dust, and additive materials comprising

3-10% by weight fly ash, 10-20% by weight lime kiln dust, ferrous sulfate, hydrated lime to provide an alkalivity of about 9 to 9.5% and water; said composition containing at least 0.2% by weight ferrous ions and being hardenable through chemical reactions, the product of which includes calcium-alumino-silicates.

2. The composition of claim 1 wherein said ferrous ions are added as ferrous hepta-hydrate.

3. The composition at claim 1 containing 5-15% by weight of the ferrous compound and about 5-15% by weight of lime.

4. The composition of claim 3 wherein said ferrous compound is added as waste pickle liquor.

5. The composition of claim 3 wherein said ferrous compound is ferrous sulfate hepta-hydrate.

6. The composition of claim 1 wherein the weight percent of ferrous ions is about 0.2 to 10.

7. The composition of claim 1 wherein the calcium content is about 5 to 10% by weight.

8. The composition of claim 1 wherein said composition has a content of silicon oxide of about 2 to 10% by weight.

9. The composition of claim 1 wherein said composition has a content of aluminum oxide of about 1 to 5% by weight.

10. The composition of claim 1 wherein said waste material is electric arc furnace dust.

11. The composition of claim 1 wherein said waste material is chemical waste sludge.

* * * * *